US010732783B2

(12) United States Patent
Yang et al.

(10) Patent No.: US 10,732,783 B2
(45) Date of Patent: Aug. 4, 2020

(54) IDENTIFYING IMAGE COMMENTS FROM SIMILAR IMAGES

(71) Applicant: Microsoft Technology Licensing, LLC, Redmond, WA (US)

(72) Inventors: Kuiyuan Yang, Beijing (CN); Wei-Ying Ma, Redmond, WA (US); Chunyan Liu, Beijing (CN); Di Li, Beling (CN); Pengfei Xu, Beijing (CN); Yong Rui, Sammamish, WA (US); Baoxun Wang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 916 days.

(21) Appl. No.: 14/981,816

(22) Filed: Dec. 28, 2015

(65) Prior Publication Data

US 2017/0185236 A1    Jun. 29, 2017

(51) Int. Cl.
*G06F 3/0481* (2013.01)
*G06F 16/583* (2019.01)
(Continued)

(52) U.S. Cl.
CPC ............ *G06F 3/0481* (2013.01); *G06F 16/58* (2019.01); *G06F 16/583* (2019.01);
(Continued)

(58) Field of Classification Search
CPC ......... G06F 17/30244; G06F 17/30247; G06F 17/30268; G06F 17/30277; G06F 3/0481;
(Continued)

(56) References Cited

U.S. PATENT DOCUMENTS 7,729,916 B2    6/2010 Coffman et al.
7,814,048 B2    10/2010 Zhou et al.
(Continued)

FOREIGN PATENT DOCUMENTS

KR    2006/0117860 A    11/2006
WO    WO2006/129967 A1    12/2006
WO    WO2009/007901 A1    6/2009

OTHER PUBLICATIONS

Augello, et al., "A Modular Framework for Versatile Conversational Agent Building", In Proceedings of International Conference on Complex, Intelligent and Software Intensive Systems, Jun. 30, 2011, 6 pages.
(Continued)

*Primary Examiner* — Ting Z Lee
(74) *Attorney, Agent, or Firm* — Schwegman Lundberg & Woessner, P.A.

(57) ABSTRACT

An image chat application generates comments to images based on features of the images. In one example, the image chat application searches through a repository of stored image-comment pairs to identify a stored image that is similar to the image, and generates a comment to the image based on an identified stored image-comment pair. In another example, the image chat application may identify and tag particular objects that dominate an image, and may generate a comment to the image based on characteristics of those particular objects. In this second example, the image chat application further generates a comment to the image based on comments previously associated with the identified tag.

20 Claims, 9 Drawing Sheets

(51) Int. Cl.
G06F 16/58 (2019.01)
G06K 9/00 (2006.01)
H04L 12/58 (2006.01)

(52) U.S. Cl.
CPC .......... *G06K 9/00671* (2013.01); *H04L 51/02* (2013.01); *H04L 51/04* (2013.01); *H04L 51/10* (2013.01); *H04L 51/32* (2013.01)

(58) Field of Classification Search
CPC ... G06F 16/58; G06F 16/583; G06K 9/00671; H04L 51/04; H04L 51/32; H04L 51/10; H04L 51/02
See application file for complete search history.

(56) References Cited

U.S. PATENT DOCUMENTS

| | | | |
|---|---|---|---|
| 8,856,236 | B2 | 10/2014 | Moore et al. |
| 8,949,725 | B1 | 2/2015 | Goncharuk et al. |
| 9,311,337 | B2* | 4/2016 | Mese ................... G06F 16/583 |
| 2005/0270293 | A1 | 12/2005 | Guo et al. |
| 2008/0052312 | A1* | 2/2008 | Tang ................... G06F 16/583 |
| 2009/0060294 | A1* | 3/2009 | Matsubara ........... G06F 16/532 382/118 |
| 2009/0193123 | A1 | 7/2009 | Mitzlaff |
| 2012/0041903 | A1 | 2/2012 | Beilby et al. |
| 2012/0155717 | A1* | 6/2012 | Ma ................... G06F 17/30259 382/118 |
| 2012/0233143 | A1* | 9/2012 | Everingham ....... G06F 16/9032 707/706 |
| 2012/0260263 | A1 | 10/2012 | Edoja |
| 2013/0212501 | A1 | 8/2013 | Anderson et al. |
| 2014/0122083 | A1 | 5/2014 | Xiaojiang |
| 2014/0122531 | A1* | 5/2014 | Zuccarino ......... G06F 17/30247 707/780 |
| 2014/0125576 | A1* | 5/2014 | Asuke ..................... A63F 13/26 345/156 |
| 2014/0300563 | A1* | 10/2014 | Iwaki .................... G06F 17/241 345/173 |
| 2015/0066479 | A1 | 3/2015 | Pasupalak et al. |
| 2015/0186420 | A1* | 7/2015 | Yan ................... G06F 17/30268 707/736 |
| 2016/0171346 | A1* | 6/2016 | Han ......................... G06K 9/66 382/103 |
| 2016/0260130 | A1* | 9/2016 | Chand ................ G06Q 30/0256 |

OTHER PUBLICATIONS

Galitsky, et al., "Improving Trust in Automation of Social Promotion", In Intersection of Robust Intelligence and Trust in Autonomous Systems: Papers from the AAAI Spring Symposium, Mar. 24, 2014, 8 pages.

Galitsky, Boris, "Recognizing Intent and Trust of a Facebook Friend to Facilitate Autonomous Conversation", In Proceedings of AAAI Workshops at the Twenty-Ninth AAAI Conference on Artificial Intelligence, Jan. 25, 2015, 7 pages.

Lester, et al., "Conversational Agents", CRC Press, LLC. Published on: Sep. 3, 2013, avaiable at https://www.ida.liu.se/~729A15/mtrl/Lester_et_al.pdf, 17 pages.

Metz, Cade, "Google Made a Chatbot That Debates the Meaning of Life", retrieved on Aug. 25, 2015 at http://www.wired.com/2015/06/google-made-chatbot-debates-meaning-life/ Wired, Jun. 26, 2015, 10 pages.

Schuetzler, et al., "Facilitating Natural Conversational Agent Interactions: Lessons from a Deception Experiment", In Proceedings of Thirty Fifth International Conference on Information Systems, Dec. 14, 2014, 2 pages.

* cited by examiner

IDENTIFYING IMAGE COMMENTS FROM SIMILAR IMAGES

BACKGROUND

Artificial conversational entities, also known as chat bots, commonly conduct conversations with human users via auditory or textual inputs across a wide range of social platforms. In some examples, chat bots can use natural language processing systems to process an auditory or textual input and generate a textual reply based on word patterning. With a recent prevalence in images becoming a popular medium for communication, chat bots are now often relied upon to engage users in conversation about particular images displayed on social platforms.

A common approach is for a chat bot to generate comments on a user image based on textual captions or comments previously associated with the image. When a user introduces a new image, textual captions or comments upon which to base a comment is extremely sparse, and in some cases non-existent. As a result, systems are often unable to generate comments to images introduced by users for the first time.

SUMMARY

This disclosure describes systems and methods for implementing an image chat application that generates comments to user images based on features of the user images. In one example, the image chat application can search through a repository of stored images to identify a stored image that is similar to the user image. The image chat application can further generate and submit a comment to the user image based on a comment that is paired with the similar image. In some examples, the image chat application may leverage a deep neural network (DNN) to compare a user image with those stored in a repository of stored images.

In another example, the image chat application may identify and tag particular objects that dominate a user image, and generate a comment to be associated with the user image based on characteristics of the dominant objects. The image chat application may leverage DNNs to identify one or more tags that correspond to the dominant objects in the user image. In some examples, the one or more tags may be sourced from a repository of tags that are commonly used by particular user or a user group. The image chat application can further generate and submit a comment to the user image based on comments previously associated with the identified tag.

This summary is provided to introduce a selection of concepts in a simplified form that is further described below in the Detailed Description. This Summary is not intended to identify key features of the claimed subject matter, nor is it intended to be used as an aid in determining the scope of the subject matter. The term "techniques," for instance may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of the reference identifies the figure in which the reference number first appears. The same reference numbers in different figures indicate similar or identical items.

DETAILED DESCRIPTION

Examples described herein provide comments directed towards user images. In various examples, an image chat application receives user images that are submitted into a domain space, such as a web-based social media platform. The image chat application processes the user images to identify features that are similar to features of other images in a dataset of stored images. Similar features may include dominant objects shared between the user image and stored images. In various examples, a dominant object may be a most prominent object that draws attention in a user image. For example, in a user image of a dog playing in a field, the dominant object may be the dog. In another example, a user image may include a motorcyclist navigating through a winding road. In this instance, the dominant object may be the motorcycle. In some examples, comments associated with stored images may be presented as a response to the user image. The comments may be intended to further engage the user's attention by mimicking a social interaction. By keeping a user engaged, the user may be less likely to navigate away from the existing domain space. Examples of domain spaces may include, but are not limited to, search engines, computing device applications, social application platforms, games, informational services, movies services, television and/or programming services, music services, and reading services.

In various examples, the image chat application performs this objective by extracting feature representations of a user image and a dataset of stored images, and determines a similarity between the respective images using a Deep Neural Network (DNN). Comments previously associated with the images having similar features may then be associated with the user image based on the determined similarity. In doing so, the image chat application may address data sparsity problems that often arise when a user presents a new image that has no textual caption or comment history. Thus, a DNN can leverage a learned pattern history between images and comments and provide a user with a relevant comment to an image posted for display, even when there is minimal history of user interaction with the image.

The methods and systems described within this disclosure can be implemented to keep users engaged within a digital eco-system, by maintaining a conversational dialogue that focuses on a user image. This can subsequently improve a user experience, and provide operators of the digital eco-system with further opportunities to engage the user in other aspects, such as advertisements, within the domain space.

Figure 1:
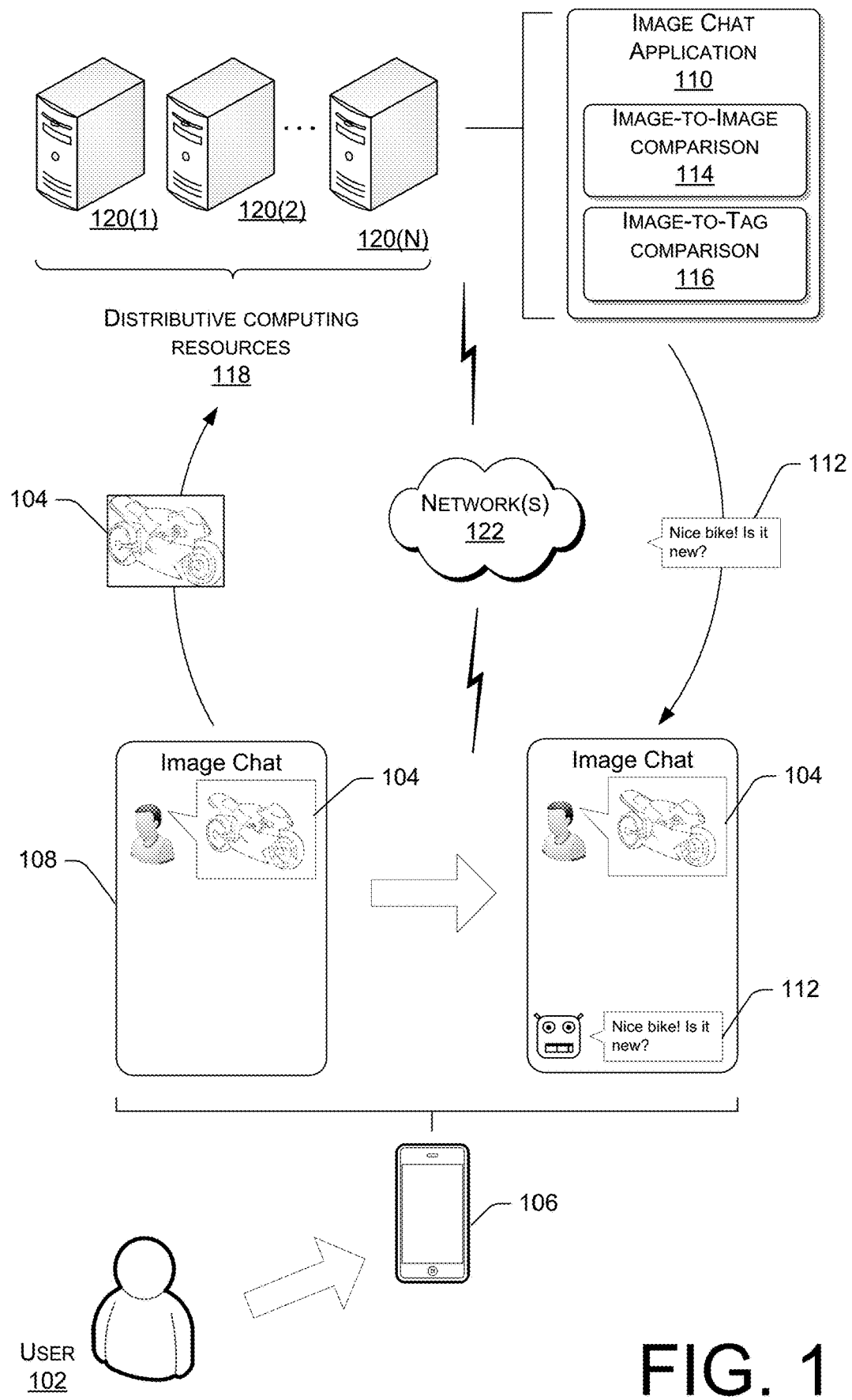
FIG. 1 is a block diagram that shows an example environment in which an image chat application may generate a comment that is directed towards a user image.

FIG. 1 is a block diagram that shows an example environment in which an image chat application may generate a comment that is directed towards a user image. In the illustrated example, a client device(s) 106 may submit data indicating a user image 104 via client device(s) 106. The data indicating a user image 104 may include the user image 104; in some examples the data indicating a user image 104 may include a parameter or pointer to the user image 104 stored elsewhere, such as a Uniform Resource Locator (URL) or other indicator that points to the user image 104. In various examples, the client device(s) 106 may belong to a variety of categories or classes of devices such as traditional server-type devices, desktop computer-type devices, mobile-type devices, special purpose-type devices, embedded-type devices, wearable-type devices, implanted computing devices, personal computers, automotive computers, network-enabled televisions, thin clients, terminals, game consoles, gaming devices, work stations, media players, personal video recorders (PVRs), set-top boxes, cameras, integrated components for inclusion in a computing device, appliances, or any other sort of computing device configured to receive user input. Thus, client device(s) 106 can include a diverse variety of device types and are not limited to a particular type of device.

In the illustrated example, the client device(s) 106 may submit data indicating a user image 104 to an image chat application 110. In other examples, the client device(s) 106 may submit data indicating the user image 104, such as a parameter or pointer to the user image 104 located at an entity, such as a search engine, computing device application, social application platform, game, informational service, movies service, television and/or programming service, music service, or reading service.

In response to submitting data indicating the user image 104, the image chat application 110 may receive the image and determine a relevant comment 112 to direct towards the user image 104 based on one of two techniques. The two techniques include an image-to-image comparison technique 114 and an image-to-tag comparison technique 116.

In the illustrated example, the image chat application 110 may operate on one or more distributed computing resources 118. In various examples, the distributed computing resources 118 may include one or more computing device(s) 120 that operate in a cluster or other configuration to share resources, balance load, increase performance, provide failover support or redundancy, or for other purposes.

In various examples, the one or more computing device(s) 120 can include one or more interfaces to enable communications with other networked devices, such as client device(s) 106, via one or more network(s) 122. For example, the one or more network(s) 122 can include public networks such as the Internet, private networks such as an institutional and/or personal intranet, or some combination of private and public networks. The one or more network(s) 122 can also include any type of wired and/or wireless network, including but not limited to local area network (LANs), wide area networks (WANs), satellite networks, cable networks, Wi-Fi networks, WiMax networks, mobile communications networks (e.g., 3G, 4G, and so forth) or any combination thereof. The one or more network(s) 122 can utilize communications protocols, including packet-based and/or datagram-based protocols such as internet protocol (IP), transmission control protocol (TCP), user datagram protocol (UDP), or other types of protocols. Moreover, the one or more network(s) 122 can also include a number of devices that facilitate network communications and/or form a hardware basis for the networks, such as switches, routers, gateways, access points, firewalls, base stations, repeaters, backbone devices, and the like. In some examples, the one or more network(s) 122 can further include devices that enable connection to a wireless network, such as a wireless access point (WAP). Example examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

Figure 2:
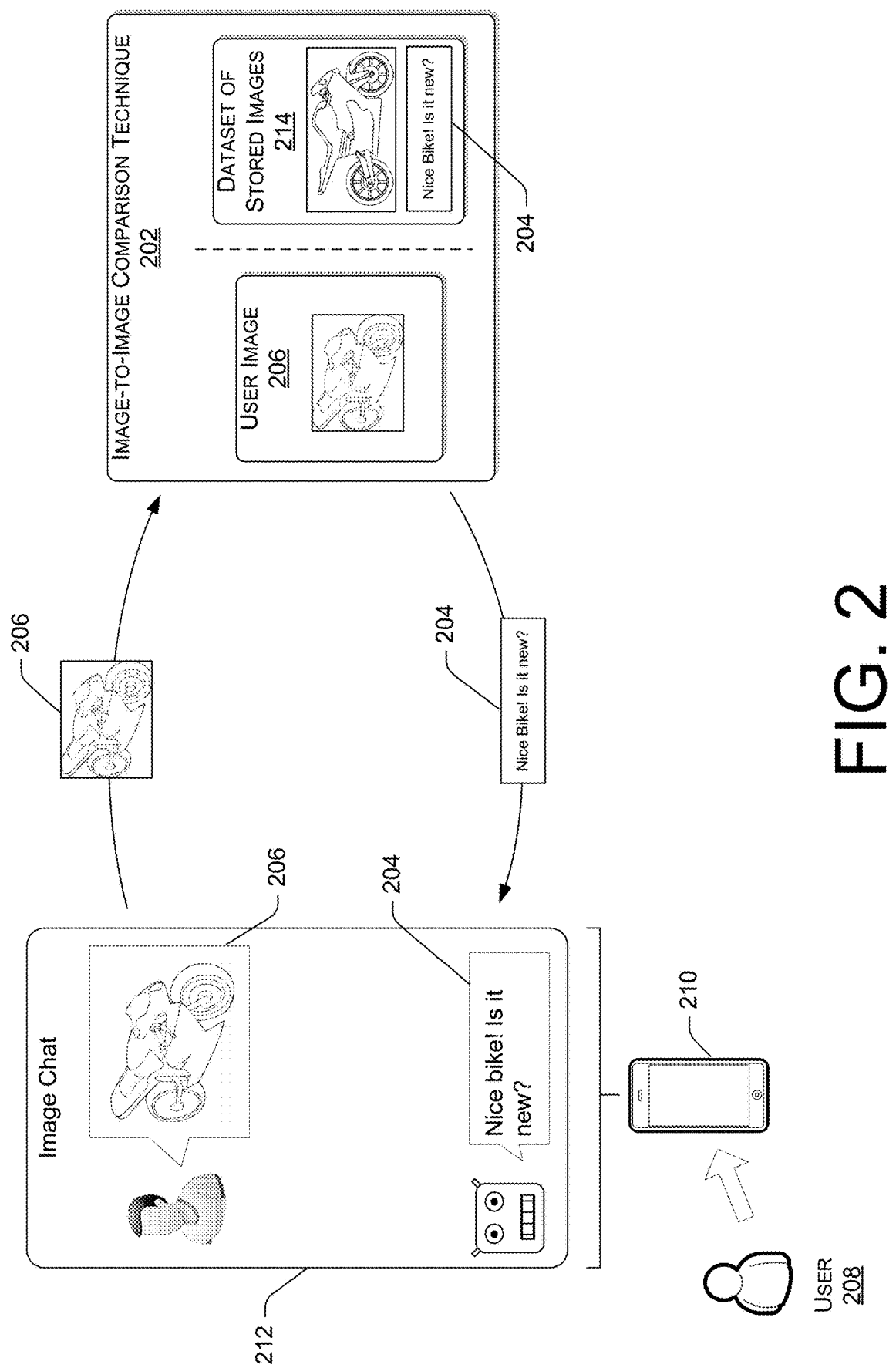
FIG. 2 is a block diagram that shows an example implementation of the image-to-image comparison technique that generates a comment to associate with a user image.

FIG. 2 is a block diagram that shows an example implementation of the image-to-image comparison technique 202 that generates a comment 204 to associate with a user image 206. Thus, a client device 210 may submit data indicating a user image 206 via a client device 210 or via a social media platform image chat application 212. In the illustrated example, the image chat application may use the image-to-image comparison technique 202 to compare a user image 206 with a dataset of stored images 214, and select a similar image from the dataset that possesses comparably similar features to the user image 206. In doing so, the image chat application may identify a comment 204 associated with the similar image from the dataset of stored images 214, and submit the identified comment 204 as a response to the user image 206. In some examples, a plurality of comments may be associated with the selected stored image. In this instance, the image chat application may randomly select a comment 204 from the plurality of comments to associate with the user image 206.

In a non-limiting example, a client device 210 may submit data indicating a user image 206 of a "grinning cat." In response, the image chat application, using the image-to-image comparison technique 202 may process the user image 206, and identify an image of a similar cat within a dataset of stored images 214. In doing so, the image chat application may return a comment 204, such as "That's a very happy cat" as a response to the user image 206. In this example, the comment 204 may be intended to elicit a further response from the user 208, thus keeping the user engaged.

In various examples, the image-to-image comparison technique 202 can be performed by any known digital image recognition method or system. In some examples, the digital image recognition process may involve measuring the Euclid distance between the user image 206 and individual images in the dataset of stored images 214 using a Deep Neural Network (DNN). Using a DNN are discussed in more detail below, with reference to FIGS. 4 and 5.

In some examples, the image-to-image comparison technique 202 may focus on identifying similar images that compare wholly with a user image 206. In other examples, the image-to-image comparison technique 202 may instead focus only on one dominant object of the user image 206. For example, a client device 210 may submit data indicating a user image 206 of a "cat on a beach." In response, the image-to-image comparison technique 202 may identify one or more comments associated with similar images of the "cat," and may return a comment 204, such as "that's a very happy cat." In another example, the image-to-image comparison technique 202 may instead focus on multiple dominant objects of the user image 206. Using the above example of a "cat on a beach," similar images may be identified that share two dominant objects, the first being a "cat," and the second being "a beach." Therefore, rather than returning a comment 204 that is based on similar images of the "cat," the image chat application may instead combine the use of the first dominant object with a second dominant object and return a comment "that's a very happy cat enjoying beach weather." By providing comments within a proper context of the user image 206, the image chat application may increase likelihood that the user 208 will remain engaged in the domain space. Doing so also reduces a likelihood of the image chat application having to randomly select a comment 204 from a plurality of comments, because a focus on multiple dominant objects is likely to return fewer similar images.

Figure 3:
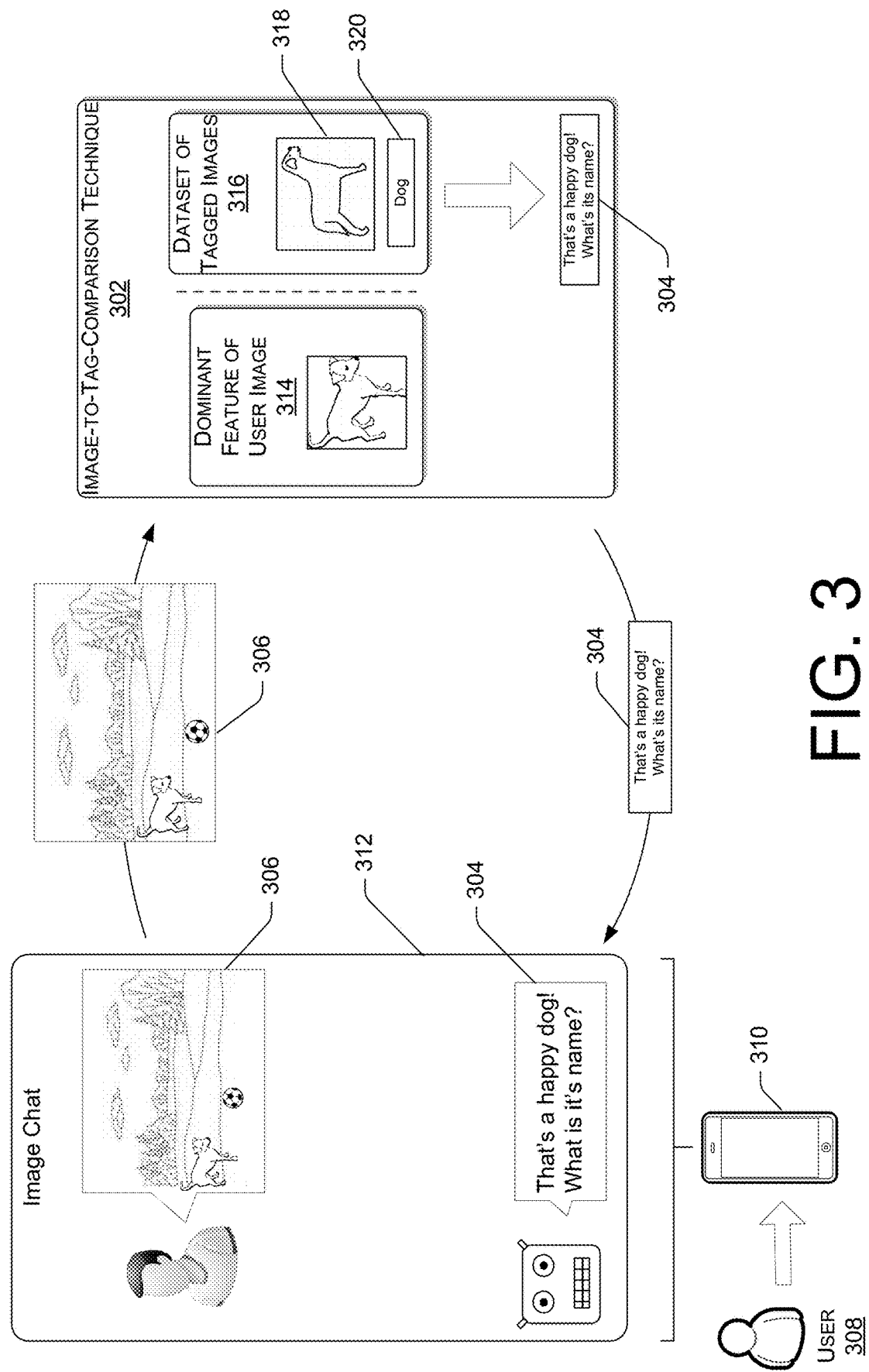
FIG. 3 is a block diagram that shows an example implementation of the image-to-tag comparison technique that generates a comment to associate with a user image.

FIG. 3 is a block diagram that shows an example implementation of the image-to-tag comparison technique 302 that generates a comment 304 to associate with a user image 306. In various examples, the user image 306 may correspond to user image 206 or 104. Thus, a client device 310 may submit data indicating a user image 306 or a via social media platform image chat application 312.

In the illustrated example, the image chat application may use the image-to-tag comparison technique to identify a dominant object 314 in the user image 306. In some examples, the dominant object 314 may be extracted from a user image 306 using any known object recognition method that identifies patterns and regularities in image data. The term "object" as used herein describes tangible entities that can be depicted in an image, such as an automobile, animal, person, and device. In the illustrated example of FIG. 3, the user image 306 depicts a landscape background with a dog and a soccer ball in the foreground. The dominant object 314 associated with the user image 306 is determined as the dog.

In the illustrated example, in response to identifying a dominant object 314 of a user image 306, the image-to-tag comparison technique 302 may compare the dominant object 314 of the user image 306 with a dataset of tagged images 316. In doing so, the image chat application may select an image from the dataset of tagged images 316, as a similar image 318, which possesses comparably similar features to the dominant object 314 of the user image 306. Further, a tag 320 that is associated with the similar image 318 may be identified.

In response to identifying the one or more tags 320 associated with the similar image 318, the image-to-tag comparison technique may further identify one or more comments associated with the tag 320. In this instance, the image chat application may randomly select a comment 304 from the plurality of comments to direct towards the user image 306.

In various examples, the dataset of tagged images 316 may include thousands, if not millions, of images at least some of which have assigned tags that are commonly used by a particular user or a user group. For example, consider a user image 306, where the dominant object 314 is a striped shirt. A comparison of the dominant object 314 to the dataset of tagged images 316 may identify a similar tagged image of striped shirt, with an assigned "clothing" tag. Therefore, on the basis of the similarity between the dominant object 314 of the user image 306 and the similar image 318 from the dataset of tagged images 316, a comment 304 associated with the tag "clothing" may be directed towards the user image 306. In this instance, the tag "clothing" has become a bridge between the user image 306 and a comment 304 generated by the image chat application.

In various examples, the image chat application may again use the image-to-tag comparison technique to refine an initial "clothing" tag by comparing the dominant object 314 of the user image 306 to additional datasets of tagged images. In some examples, an index of datasets may be used to associate the additional datasets with a tag from the initial dataset of tagged images. For example, the index of datasets may identify sub-categories or refinements of an initial tag. In other words, the initial tag may identify the dominant object 314 of the user image 306 as a tangible entity, and the tag associated with additional datasets may describe features commonly associated with the tangible entity. For example, an initial tag of "clothing" may be associated with additional datasets that relate to a "clothing texture tag," "clothing style tag," or "clothing articles tag." Similarly, an initial tag of "food" may be associated with additional datasets that relate to "food ethnicity," "and "food style." In another example, an initial tag associated with an "animal" may be associated with additional datasets that relate to "breed." Thus, in some examples, the initial dataset of tagged images 316 may be used to identify a dominant object 314 in a user image 306, whereas the additional datasets that relate to an identified tag, may be used to describe the dominant object 314.

Consider the non-limiting example of a user image 306 that includes a dominant object 314 of a dog. The initial dataset of tagged images 316 may identify a "dog" tag based on identifying a similar image 318 from the dataset of tagged images 316. An additional dataset of tagged images that further relate to "dog breed" which may be used to identify a more relevant comment for the user image 306. In this example, a similar image in the additional dataset of tagged images may identify a particular dog breed tag, such as "German Shepherd." Further, the image chat application may identify a comment associated with the "German Shepherd" tag to direct towards the user image 306.

In various examples, the image-to-tag comparison technique 302 can be performed by any known digital image recognition method or system. In some examples, the digital image recognition process may involve measuring the Euclid distance between the user image 306 and individual images in the dataset of tagged images 316 using a Deep Neural Network (DNN). Using a DNN is discussed in more detail below, with reference to FIGS. 4 and 5.

Figure 4:
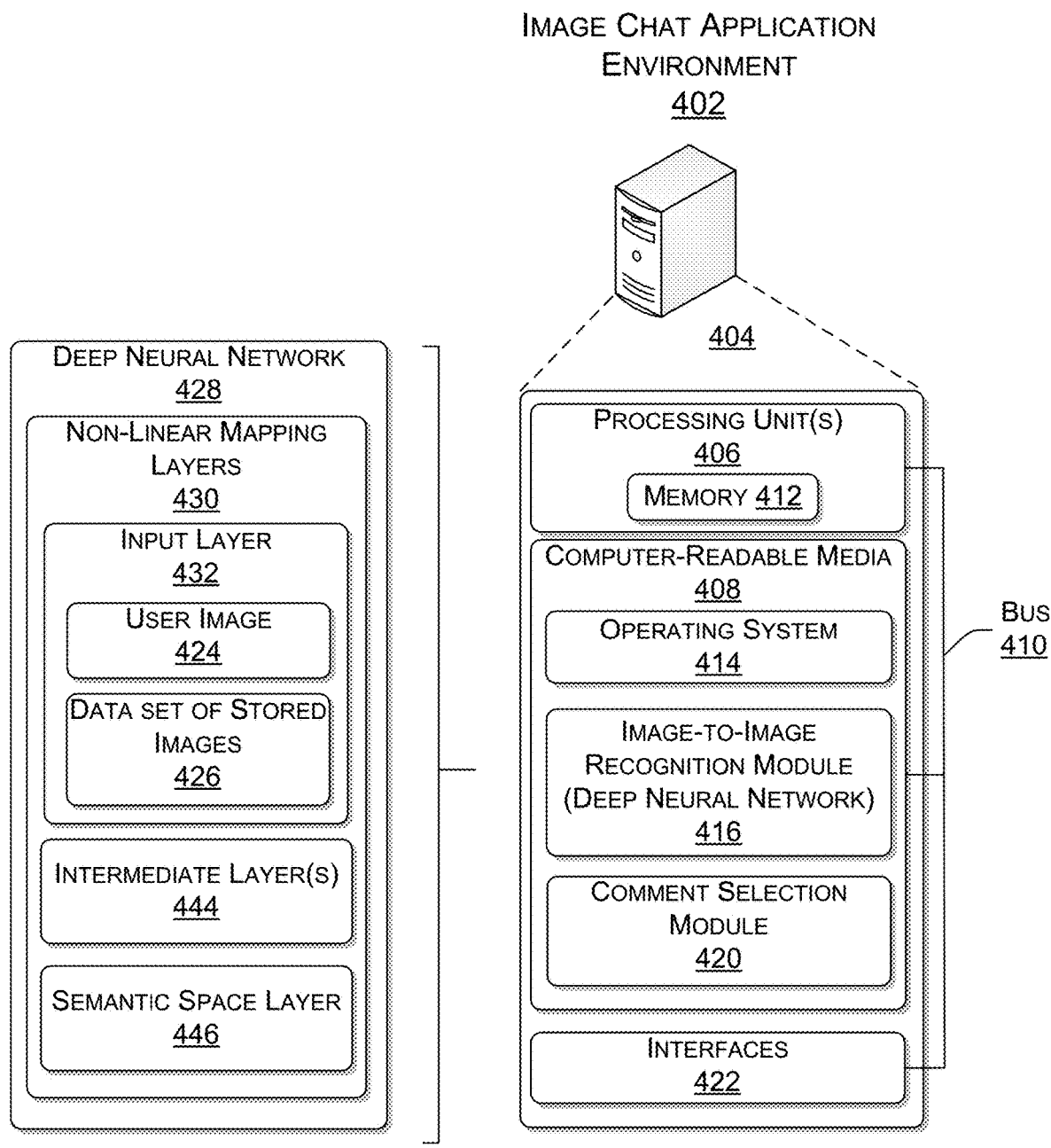
FIG. 4 illustrates an example image chat application environment 402 that may implement the image-to-image comparison technique to provide a comment as a response to a user image.

FIG. 4 illustrates an example image chat application environment 402 that may use the image-to-image comparison technique to provide a comment as a response to a user image. In some examples, the example image chat application environment 402 may comprise one or more computing device(s) 404 configured to execute the image chat application. In some examples, the one or more computing device(s) 404 may correspond to the one or more computing device(s) 120.

In various examples, computing device(s) 404 may include any computing device having one or more processing unit(s) 406 operably connected to the computer-readable media 408 such as via a bus 410, which in some instances can include one or more of a system bus, a data bus, an address bus, a PCI bus, a Mini-PCI bus, and any variety of local, peripheral, and/or independent buses. The processing unit(s) 406 can also include a separate memory, such as memory 412, on board a CPU-type processor, a GPU-type processor, an FPGA-type accelerator, a DSP-type accelerator, and/or another accelerator. Executable instructions stored on computer-readable media 408 can include, for example, an operating system 414, an image-to-image recognition module 416, and a comment selection module 420.

In various examples, computing device(s) 404 may implement executable instructions stored on computer-readable media 408. The executable instructions implement modules, such as but not limited to one or more of the image-to-image recognition module 416 and comment selection module 420. These modules are passed an execution thread, and utilize pointer(s), parameters, etc. to read data, such as image data, metadata, text, tags, etc, and to take actions such as are described in this detailed description.

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Computer-readable media 408 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in computing device(s) 404, while in some examples one or more of a CPU, GPU, and/or accelerator is external to computing device(s) 404.

Computing device(s) 404 can also include one or more interfaces 422 to enable communications between the computing device(s) 404 and other networked devices. In various examples, the one or more computing device(s) 404 can correspond to the client device illustrated FIG. 1 (e.g., 120(1), 120(2), or 120(N)). The interfaces 422 can include one or more network interface controllers (NICs), I/O interfaces, or other types of transceiver devices to send and receive communications over a network.

Computer-readable media 408, may include computer storage media and/or communication media. Computer storage media can include volatile memory, nonvolatile memory, and/or other persistent and/or auxiliary computer storage media, removable and non-removable computer storage media implemented in any method or technology for storage of information such as computer-readable instructions, data structures, program modules, or other data. Computer-readable media 408 can be an example of computer storage media similar to memory 412. Thus, the computer-readable media 408 and memory 412 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

In the illustrated example, the computer-readable media 408 can include an image-to-image recognition module 416. The image-to-image recognition module 416 can perform a comparison of a user image 424 with a dataset of stored images 426 using a Deep Neural Network (DNN) 428. In various examples, the DNN 428 can project feature representations extracted from different images through a series of non-linear mapping layers 430. The feature representations can be received at an input layer 432.

In the illustrated example, the input layer 432 can include the user image 424 and the dataset of stored images 426. The user image 424 can be received directly from a client device, or downloaded from a web-based social media platform that is accessed by the client device. Further, the dataset of stored images 426 may include millions of images with paired comments, collected from various social platforms, and other domains spaces. Examples of domain spaces may include, but are not limited to, search engines, computing device applications, social application platforms, games, informational services, movies services, television and/or programming services, music services, and reading services.

In the illustrated example, each image in the dataset of stored images 426 is paired with one or more comments. In some examples, the one or more comments may correspond to user comments that were previously associated with the stored image by other users. In other examples, the one or more comments may correspond to stock comments pre-written by editors of the image chat application for the purpose of imitating conversation.

In some examples, the dimensional density of an input layer 432 may not be conducive to efficiently run the image chat system. Thus, the dimensional density of feature representations can be progressively reduced through a series of intermediate non-linear mapping layers 444 to a final semantic space layer 446. In this example, the similarity of the user image 424 and individual stored images in the dataset of stored images 426 is determined by measuring the Euclid distance between these respective images within the final semantic space layer 446.

In some examples, a reduction in dimensional density can be performed using one of more dimensionality reduction techniques, such as but not limited to, "Top-K most frequent feature," the principle component analysis technique, and local sensitive hashing (LSH). The non-linear mapping layers 430 of the user image 424 and the dataset of stored images 426 can use any combination of techniques to perform the dimensional and data reduction.

In some examples, a reduction in the dimensional density of the feature vectors within the semantic space can improve processor efficiencies in determining similarities between the user input image and the data set of stored image-comment pairs.

In the illustrated example, the computer-readable media 408 further includes a comment selection module 420. In various examples, once a similar stored image from the dataset of stored images 426 has been identified, the comment selection module 420 may select a comment that is associated with the similar stored image to display as a response to a display of the user image. Since the similar stored image may include a plurality of comments, the comment selection module 420 may randomly select a comment from the plurality of comments to provide as a response to the user image.

Figure 5:
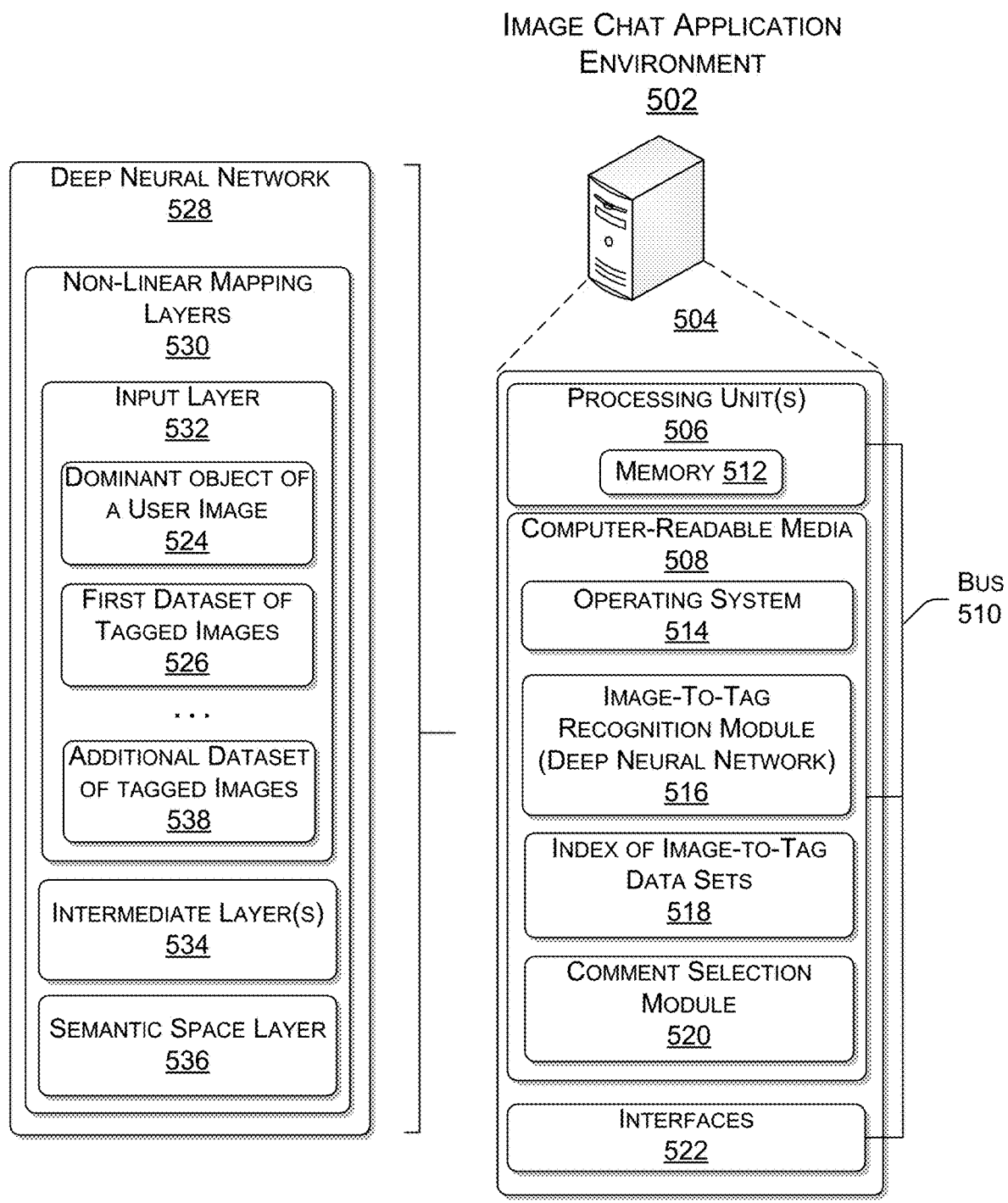
FIG. 5 illustrates an example image chat application environment 502 that may implement the image-to-tag comparison technique to provide a comment as a response to a user image.

FIG. 5 illustrates an example image chat application environment 502 that may implement the image-to-tag comparison technique to provide a comment as a response to a user image. In some examples, the example image chat application environment 502 may comprise one or more computing device(s) 504 configured to execute the image chat application. In some examples, the one or more computing device(s) 504 may correspond to the one or more computing device(s) 120 and 404.

In various examples, computing device(s) 504 can include any computing device having one or more processing unit(s) 506 operably connected to the computer-readable media 508 such as via a bus 510. The one or more processing unit(s) 506 can also include separate memories such as memory 512. In some examples, the one or more processing unit(s) 506 can correspond to the one or more processing unit(s) 406, and the memory 512 can correspond to the memory 412. Further, the computer-readable media 508 can correspond to the computer-readable media 408, and the bus 510 can correspond to the bus 410. Executable instructions stored on computer-readable media 508 can include, for example, an operating system 514, an image-to-tag recognition module 516, an index of image-to-tag datasets 518, and a comment selection module 520.

Computing device(s) 504 can also include one or more interfaces 522 to enable communications between the computing device(s) 504 and other networked devices. In various examples, the one or more computing device(s) 404 can correspond to the one or more computing device(s) 120 and 404. The interfaces 422 can include one or more network interface controllers (NICs), I/O interfaces, or other types of transceiver devices to send and receive communications over a network.

In the illustrated example, the computer-readable media 508 can include an image-to-tag recognition module 516. The image-to-tag recognition module 516 can perform a comparison of a dominant object of a user image 524 with a first dataset of tagged images 526 using a Deep Neural Network (DNN) 528. In various examples, the DNN 528 can project feature representations extracted from different images through a series of non-linear mapping layers 530. The feature representations can be received at an input layer 532.

In the illustrated example, the input layer 532 can include the dominant object of the user image 524 and the first dataset of tagged images 526. The dominant object of the user image 524 can be received directly from a client device, or downloaded from a web-based social media platform that is accessed by the client device. Further, the first dataset of tagged images 526 may include millions of images with paired comments, collected from various social platforms, and other domains spaces. Examples of domain spaces may include, but are not limited to, search engines, computing device applications, social application platforms, games, informational services, movies services, television and/or programming services, music services, and reading services.

In the illustrated example, the comparison of the dominant object of the user image 524 with the first dataset of tagged images 526 is performed to identify a tagged image from the dataset that is similar to the dominant object. In doing so, the tag associated with the similar tagged image may then be used to identify a comment that is intended to be directed towards the user image. Each tag may be associated with one or more comments. The one or more comments may correspond to user comments that were previously associated with the tagged image by other users. In other examples, the one or more comments may correspond to comments prewritten by editors of the image chat application for the purpose of imitating conversation.

In some examples, the dimensional density of an input layer 532 may not be conducive to efficiently run the image chat system. Thus, the dimensional density of feature representations can be progressively reduced through a series of intermediate non-linear mapping layers 534 to a final semantic space layer 536. In this example, the similarity of the dominant object of a user image 524 and individual tagged images in the first dataset of tagged images 526 may be determined by measuring the Euclid distance between these respective images within the final semantic space layer 536.

In the illustrated example, the computer-readable media 508 may include an index of image-to-tag datasets 518. In some examples, the index of image-to-tag datasets 518 may be used to identify an additional dataset of tagged images 538 using the tag from the initial dataset of tagged images. For example, the index image-to-tag datasets 518 may identify sub-categories or refinements of an initial tag. For example, an initial tag of "clothing" may be associated with additional datasets that relate to "clothing texture," "clothing style," or "clothing articles." Similarly, an initial tag of "food" may be associated with additional datasets that relate to "food ethnicity," "and "food style." In another example, an initial tag associated with an "animal" may be further associated with additional datasets that relate to "breed."

In response to identifying an additional dataset of tagged images 538, the DNN 528 may perform a comparison of the dominant object of a user image 524 with individual tagged images of the additional dataset of tagged images 538. In various examples, the DNN 528 can project feature representations extracted from different images through a series of non-linear mapping layers 530. Thus, the dimensional density of feature representations can be progressively reduced through a series of intermediate non-linear mapping layers 534 to a final semantic space layer 536. In this example, the similarity of the dominant object of a user image 524 and individual tagged images in the additional dataset of tagged images 538 may be determined by measuring the Euclid distance between the respective images within the final semantic space layer 536. Thus, the image-to-tag recognition module 516 may identify a tag that is associated with a tagged image from the additional dataset of tagged images 538 that is determined to be similar to the dominant object of the user image 524. The tag may then be used to identify a comment that is to be directed towards the user image.

In the illustrated example, the computer-readable media 508 further includes a comment selection module 520. In various examples, once a similar tagged image from the first dataset of tagged images 526 has been identified, the comment selection module 520 may select a comment that is associated with the similar tagged image to display as a response to a display of the user image. Since the similar tagged image may include a plurality of comments, the comment selection module 520 may randomly select a comment from the plurality of comments to provide as a response to the user image.

Figure 6:
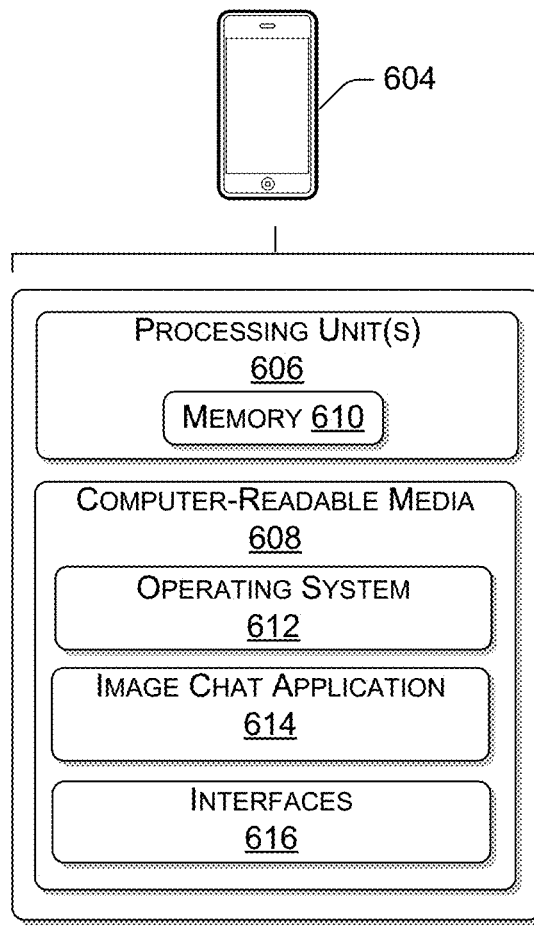
FIG. 6 illustrates an example image chat application environment 602 that may be implemented on a client device 604.

FIG. 6 illustrates an example image chat application environment 602 that may be implemented on a client device 604. Client device 604 may correspond to client device(s) 106. Client device 604 can have processing unit(s) 606 operably connected to the computer-readable media 608. The processing unit(s) 606 may be the same as or similar to processing unit(s) 406 and/or 506, and the computer-readable media 608 may be the same as or similar to the computer-readable media 408 and/or 508. In various examples, the processing unit(s) 606 may include separate memory, such as memory 610. The memory 610 may be the same as or similar to memory 412 and/or 512. Executable instructions stored on computer-readable media 608 can include, for example, an operating system 612 and an image chat application module 614.

Client device 604 may also include one or more interfaces 616 to enable communications between the client device 604 and other networked devices, such as computing device(s) 120(1), 120(2), or 120(N). The interfaces 422 may include one or more network interface controllers (NICs), I/O interfaces, or other types of transceiver devices to send and receive communications over a network.

In the illustrated example, the image chat application module 614 may perform the functions associated with the image-to-image comparison technique and/or the image-to-tag comparison technique. With reference to the image-to-image comparison technique, the image chat application module 614 may implement the functionality of the image-to-image recognition module 416 and the comment selection module 420 that is associated with the computing device(s) 404. Alternatively, the image chat application module 614 may implement only some of the functions associated with the image-to-image recognition module 416 and the comments selection module 420. In a non-limiting example, the client device 604 may submit a user image to computing device(s) 404. In doing so, the image-to-image recognition module 416 of computing device(s) 404 may also process the user image and return to the client device 604 a similar stored image from the dataset of stored images 426, along with one or more paired comments. The client device 604 may perform the functions of the comment selection module 420 of computing device(s) 404, such as by selecting a comment from the one or more paired comments as a response to the user image.

Further, with reference to the image-to-tag comparison technique, the image chat application module 614 may implement the functionality of image-to-tag recognition module 516, the index of image-to-tag datasets 518, and the comment selection module 520 that is associated with computing device(s) 504. Alternatively, the image chat application module 614 may implement only some of the functions associated with the image-to-tag recognition module 516, the index of image-to-tag datasets 518, and the comment selection module 520. In a non-limiting example, the client device 604 may process a user image to identify a dominant object. In some examples, the client device 604 may implement a DNN that corresponds to DNN 528. In other examples, the client device 604 may identify a dominant object of the user image using any known digital image recognition method or system.

The client device 604 may submit the dominant object of the user image to computing device(s) 504. The image-to-tag recognition module 516 and the index of image-to-tag datasets 518 of computing device(s) 504 may then process the dominant object to identify one or more tags, and/or one or more paired comments to associate with the dominant object. The client device 604 may perform the same or similar functions as the comment selection module 520 of computing device(s) 504 by selecting a comment from the one or more paired comments as a response to the user image. In another non-limiting example, the index of image-to-tag datasets 518 may reside on the client device 604. Therefore, in response to receiving a tag from computing device(s) 504 that corresponds to the dominant object of a user image, the client device 604 may request the computing device(s) 504 to process the same dominant object using an additional dataset of tagged images that is identified by the index of image-to-tag datasets 518.

Figure 7:
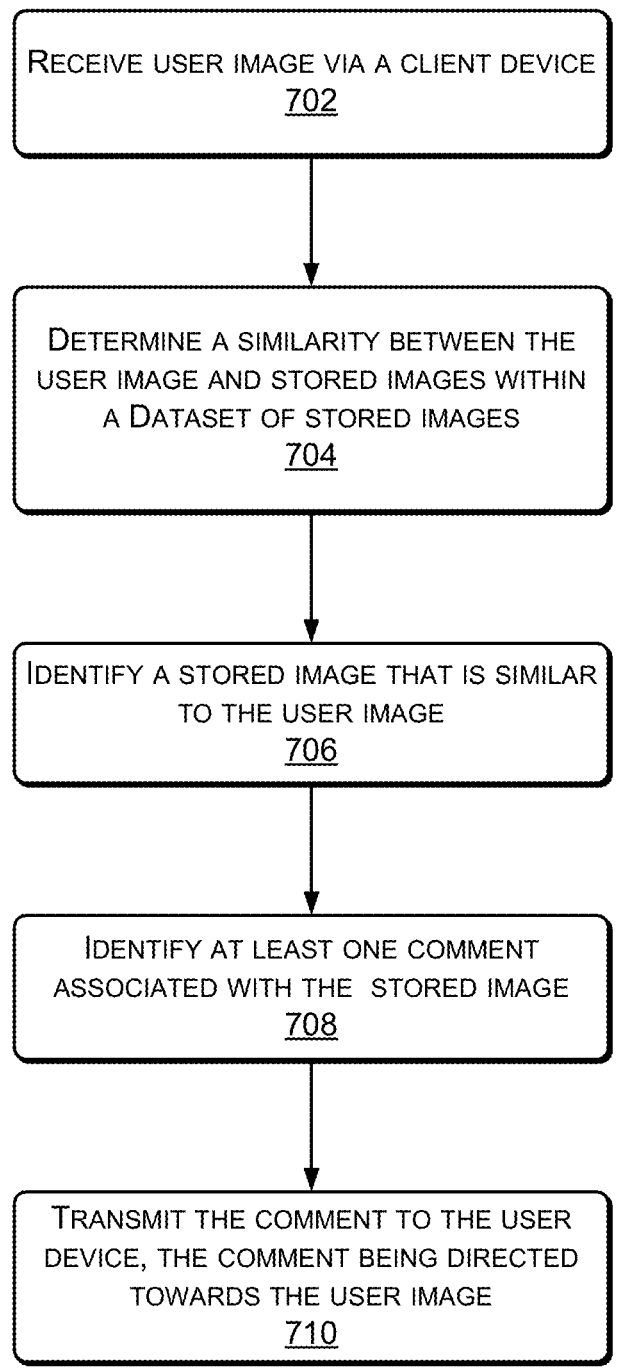
FIG. 7 is a flow diagram that illustrates an image-to-image comparison technique that is used to identify and transmit, to a client device, a comment that relates to a user image.

FIG. 7 is a flow diagram that illustrates an image-to-image comparison technique that is used to identify and transmit, to a client device, a comment that relates to a user image. At 702, the image chat application may receive a user image via a client device. In some examples, the user image is received directly from a client device, or downloaded from a web-based social media platform that is accessed by the client device.

At 704, the image chat application may determine a similarity between the user image and stored images within a dataset of stored images. In some examples, the similarity can be determined by measuring the Euclid distance between the user image and individual images in the dataset of stored images, using a normalized Deep Neural Network. In other examples, the similarity can be determined by any known digital image recognition method or system.

At 706, the image chat application may identify a stored image that is similar to the user image. The stored image is identified based on the similarity determined using the normalized Deep Neural Network.

At 708, the image chat application may identify at least one comment that is associated with the stored image. In various examples, one or more comments may be associated with the stored image that is identified as being similar to the user image. Thus, the image chat application may randomly select one comment from the one or more comments to transmit to the client device as a response to the user image.

Figure 8:
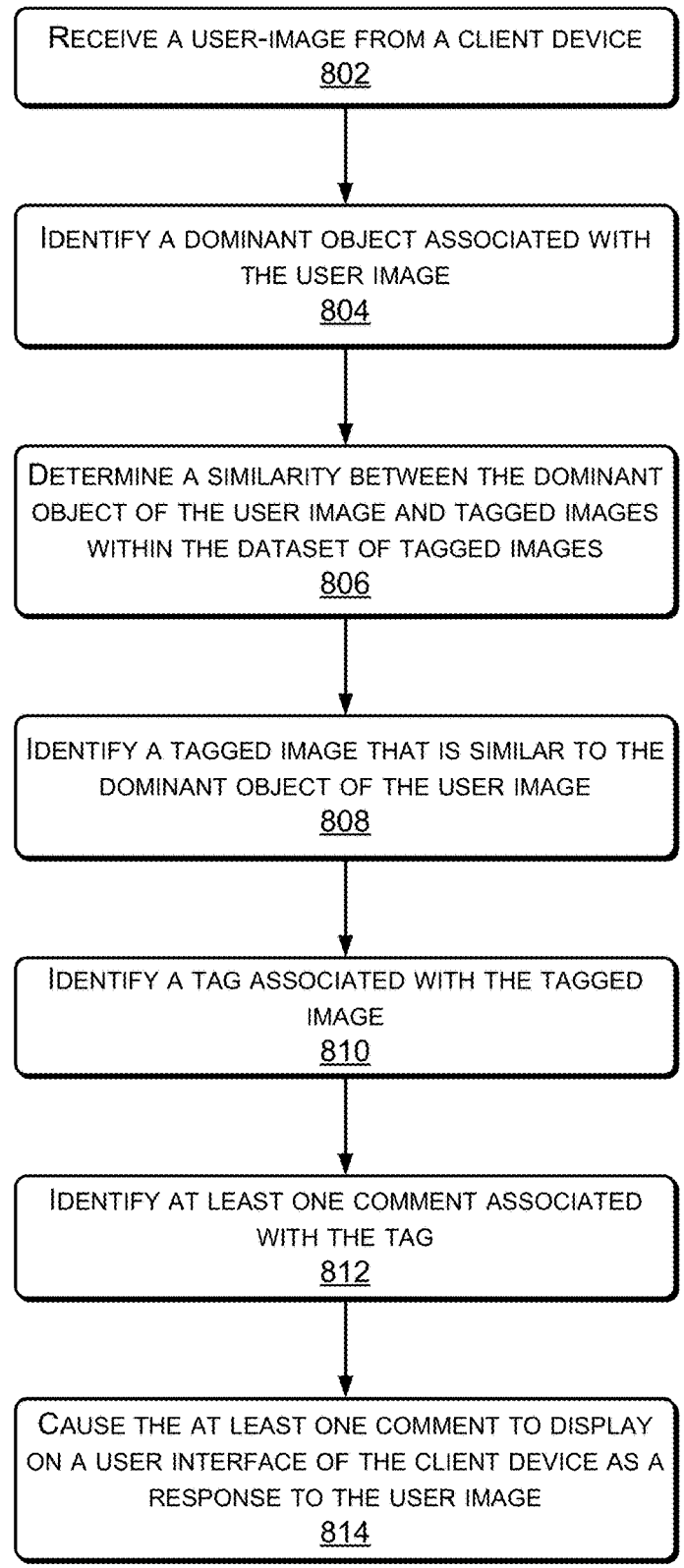
FIG. 8 is a flow diagram that illustrates an image-to-tag comparison technique that is used to identify and transmit, to a client device, a comment that relates to a user image.

FIG. 8 is a flow diagram that illustrates an image-to-tag comparison technique that is used to identify and transmit, to a client device, a comment that relates to a user image. At 702, the image chat application may receive a user image via a client device. In some examples, the user image is received directly from a client device, or downloaded from a web-based social media platform that is accessed by the client device.

At 804, the image chat application may identify a dominant object associated with the user image. In various examples, the dominant object may be extracted from the user image using any known object recognition method that identifies patterns and regularities in image data. The term "object" as used herein describes tangible entities that can be depicted in an image, such as automobile, animal, person, and device.

At 806, the image chat application may determine a similarity between the dominant object of the user image and tagged images within the dataset of tagged images. In various examples, the dataset of tagged images may include thousands, if not millions, of images each with assigned tags that are commonly used by a particular user or a particular user group.

At 808, the image chat application may identify a tagged image from the dataset of tagged images that is similar to the dominant object of the user image. The similarity between the dominant object of the user image and the tagged image is based at least in part on determining a similarity of feature representations between the dominant object and the dataset of tagged images, via a Deep Neural Network.

At 810, the image chat application may, in response to identifying a tagged image that is similar to the user image, identify a tag that is associated with the tagged image. In various examples, the tag may further identify one or more comments that are intended to be directed towards the dominant object.

At 812, the image chat application may identify at least one comment associated with the tag. The at least one comment may correspond to a user comment that was previously associated with the tagged image by other users. In other examples, the at least one comment may correspond to a comment prewritten by editors of the image chat application for the purpose of imitating conversation.

At 814, the image chat application may cause the at least one comment to display on a user interface of the client device as a response to the user image. In various examples, the client device may be used to post the user image on a web-based social media platform. Thus, the image chat application may similarly post the at least one comment on the same web-based social media platform, as a response to the original user image post.

Figure 9:
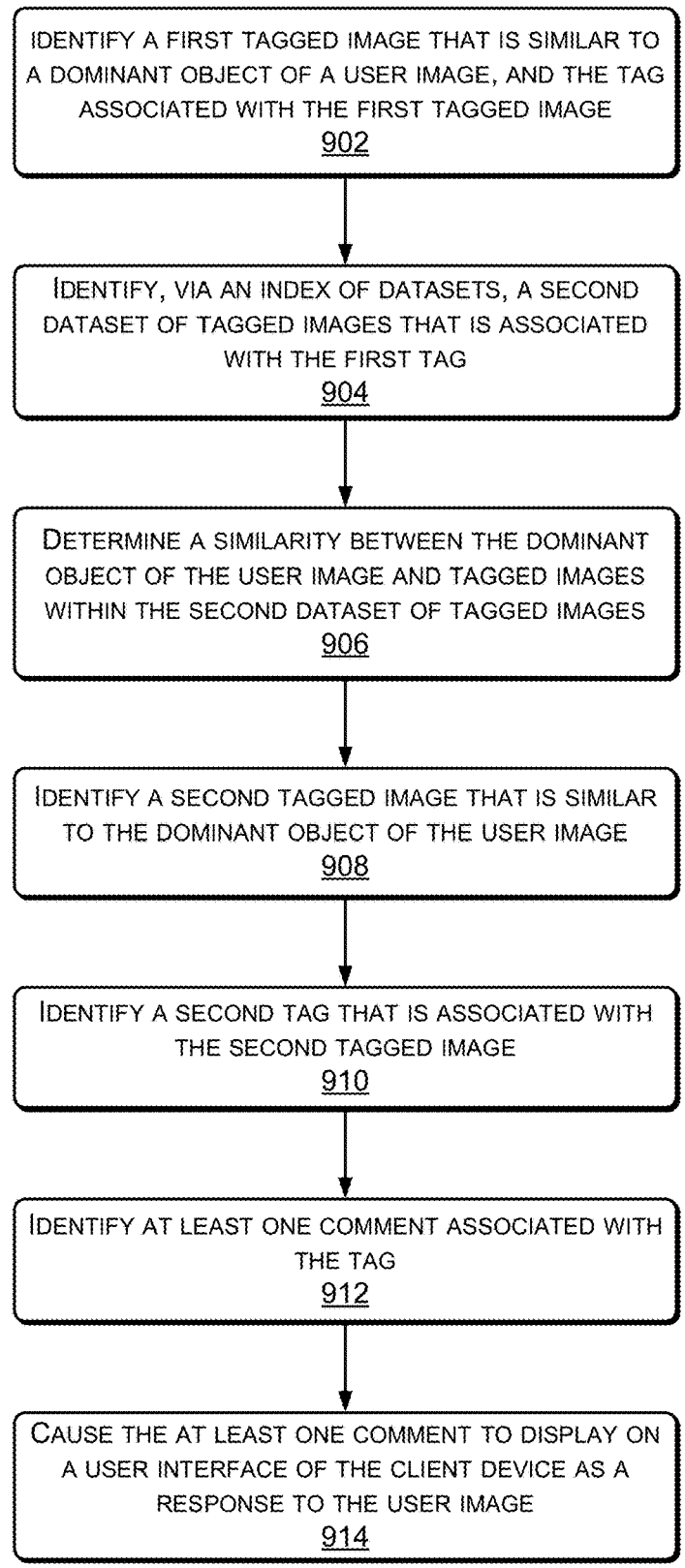
FIG. 9 is a flow diagram that illustrates and image-to-tag comparison technique that uses multiple Deep Neural Networks to identify and transmit, to a client device, a comment that relates to a user image.

FIG. 9 is a flow diagram that illustrates and image-to-tag comparison technique that uses multiple Deep Neural Networks to identify and transmit, to a client device, a comment that relates to a user image. At 902, the image chat application can identify a first tagged image that is similar to a dominant object of a user image, and the tag associated with the first tagged image. In various examples, the process of identifying the first tagged image and a corresponding tag is outlined in FIG. 8, in steps 802 through to 810.

At 904, the image chat application may identify, via an index of datasets, a second dataset of tagged images that is associated with the first tag. In various examples, an index of datasets may be used to associate a second dataset with a tag from the first dataset of tagged images. For example, the index of datasets may identify sub-categories or refinements of an initial tag. As a non-limiting example, the tag from the first dataset of tagged images may correspond to "dog," while the second dataset may relate to "dog breeds." In some examples, the image chat application may identify a second dataset via the index of datasets in response to determining that the number of comments that is returned via the first dataset exceeds a predetermined threshold. Thus, by identifying a second dataset that adds further specificity to the initial tag from the first dataset, the number of comments that is returned via the second dataset is likely to reduce.

At 906, the image chat application may determine a similarity between the dominant object of the user image and tagged images within the second dataset of tagged images. In some examples, the similarity can be determined by measuring the Euclid distance between the user image and individual images in the dataset of stored images, using a Deep Neural Network. In other examples, the similarity can be determined by any known digital image recognition method or system.

At 908, the image chat application may identify a second tagged image that is similar to the dominant object of the user image. The similarity between the dominant object of the user image and the second tagged image is based at least in part on determining a similarity of feature representations between the dominant object and the second tagged image, via a Deep Neural Network.

At 910, the image chat application may identify a second tag that is associated with the second tagged image that is identified in Step 908. In various examples, the second tag may further identify one or more comments that are intended to be directed towards the dominant object. In various examples, the one or more comments identified by the second tag are likely to provide greater detail and better context, relative to the one or more comments identified by the first tag.

At 912, the image chat application may identify at least one comment associated with the tag. The at least one comment may correspond to a user comment that was previously associated with the tagged image by other users. In other examples, the at least one comment may correspond to a comment prewritten by editors of the image chat application for the purpose of imitating conversation.

At 914, the image chat application may cause the at least one comment to display on a user interface of the client device as a response to the user image. In various examples, the client device may be used to post the user image on a web-based social media platform. Thus, the image chat application may similarly post the at least one comment on the same web-based social media platform, as a response to the original user image post.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors;
a computer-readable medium coupled to the one or more processors, including one or more modules that are executable by the one or more processors to:
receive data indicating an image;
extract, by the one or more processors, a first set of feature representations from a first object of the image and a second set of feature representations from a second object of the image;
determine a similarity between the image and individual stored images of a dataset of stored images, based at least in part on the first set of feature representations of the image and the second set of feature representations of the image;
identify a particular stored image from the dataset of stored images, based at least in part on the similarity;
identify a first comment, based at least in part on the particular stored image and the first set of feature representations of the image;
identify a second comment, based at least in part on the particular stored image and the second set of feature representations of the image;
generate, autonomously in response to identifying the first comment and the second comment, a comment by combining a portion of the first comment and a portion of the second comment; and
cause a display of the comment on a user interface of a client device, the comment being displayed as a response to a display of the image.

2. The system of claim 1, wherein the first set of feature representations from the image corresponds to the first object being a first dominant object of the image and the second set of feature representations from the image corresponds to the second object being a second dominant object of the image.

3. The system of claim 1, wherein the client device is associated with a user or a user group, and wherein the individual stored images of the dataset of stored images include at least one tag that identifies a dominant object of the individual stored images, the at least one tag being based at least in part on particular tags that are commonly associated with the user or the user group.

4. The system of claim 1, wherein the one or more modules are further executable by the one or more processors to:
determine that the image is displayed on a web-based social media platform, based at least in part on the data indicating the image; and
retrieve the image from the web-based social media platform.

5. A system comprising:
one or more processors;
a computer-readable medium coupled to the one or more processors, including one or more modules that are executable by the one or more processors to:
receive data indicating an image;
extract, by the one or more processors, a dominant object from the image;
compare the dominant object with a dataset of tagged images to select a first tagged image from the dataset of tagged images similar to the image;
identify a first tag that is associated with the first tagged image;
compare the dominant object with additional datasets of tagged images, the additional datasets associated with the identified first tag;
identify, from the comparison of the dominant object with the additional datasets, a second tagged image that is similar to the dominant object from the image;
identify a second tag that is associated with the second tagged image;
generate a comment using the second tag to describe the dominant object; and
cause a display of the comment on a user interface of a client device, the comment being displayed as a response to a display of the image.

6. The system of claim 5, wherein the one or more modules are executable to use a dataset index to identify at least one association of the additional datasets with the first tag that is associated with the first tagged image.

7. The system of claim 6, wherein the one or more modules are further executable to use the dataset index to identify refinements of the first tag that is associated with the first tagged image.

8. One or more computer-readable storage media including one or more modules that are executable by one or more processors to cause a computing system to:
receive data indicating an image;
determine a similarity between the image and individual stored images of a dataset of stored images, based at least in part on a first set of feature representations of the image including a first object and a second set of feature representations of the image including a second object;
identify a particular stored image from the dataset of stored images, based at least in part on the similarity;
identify a first particular comment from a plurality of comments associated with the particular stored image and the first set of feature representations of the image;
identify a second particular comment from the plurality of comments, based at least in part on the particular stored image and the second set of feature representations of the image;
generate, autonomously in response to the identifications of the first particular comment and the second particular comment, a particular comment by combining portions of the first particular comment and portions of the second particular comment; and
cause a display of the particular comment on a user interface of a client device, the particular comment being displayed as a response to a display of the image.

9. The one or more computer-readable storage media of claim 8, wherein the plurality of comments is based at least in part on one or more of:
comments previously posted by users on a social media platform; or
stock comments.

10. The one or more computer-readable storage media of claim 8, wherein the one or more modules are further executable by the one or more processors to select the first particular comment randomly from the plurality of comments.

11. The one or more computer-readable storage media of claim 8, wherein the one or more modules are further executable by the one or more processors to identify a tag associated with the particular stored image, and the first particular comment is identified from the plurality of comments based at least in part on the tag.

12. A computer-implemented method, comprising:
receiving, via a client device, data indicating an image;
extracting, from the image, a first set of feature representations having a first feature vector associated with a first object of the image and a second set of feature representations having a second feature vector associated with a second object of the image;
determining a similarity between the image and individual stored images of a dataset of stored images, based at least in part on the first feature vector and the second feature vector;
identifying a particular stored image from the dataset of stored images, based at least in part on the similarity;
identifying a plurality of comments based at least in part on the particular stored image;
identifying a first comment from the plurality of comments, based at least in part on the particular stored image and the first feature vector;
identifying a second comment from the plurality of comments, based at least in part on the particular stored image and the second feature vector;
generating, autonomously in response to identifying the first comment and the second comment, a comment by combining a portion of the first comment and a portion of the second comment; and
causing a display of the comment on a user interface of the client device as a response to a display of the image.

13. The computer-implemented method of claim 12, wherein the plurality of comments is associated with the individual stored images or is associated with one or more tags, the one or more tags being associated with the individual stored images.

14. The computer-implemented method of claim 12, further comprising selecting the second comment randomly from the plurality of comments.

15. The computer-implemented method of claim 12, wherein the individual stored images of the dataset of stored images include one or more tags that identify a dominant object of the individual stored images, the method further comprising identifying a tag from the one or more tags that is associated with the particular stored image, wherein identifying the plurality of comments is further based at least in part on the tag.

16. The computer-implemented method of claim 12, further comprising reducing a first length of the first feature vector and a second length of the second feature vector to a same predetermined feature vector length.

17. The computer-implemented method of claim 12, further comprising reducing a first length of the first feature vector and a second length of the second feature vector progressively through a plurality of non-linear mapping layers associated with the dataset of stored images and the image.

18. The computer-implemented method of claim 17, wherein reducing a first length of the first feature vector and a second length of the second feature vector is performed using at least one of a Top-K most frequent feature dimensionality reduction technique, a principle component analysis technique, or a local sensitive hashing technique.

19. A computer-implemented method, comprising:
receiving, via a client device, data indicating an image;
extracting, from the image, a first set of feature representations having a first feature vector;
determining a similarity between the image and individual stored images of a dataset of stored images, based at least in part on the first feature vector and a second feature vector extracted from the individual stored images;
identifying a particular stored image from the dataset of stored images, based at least in part on the similarity;
identifying a plurality of comments based at least in part on the particular stored image; and
causing, a display of at least a particular comment of the plurality of comments on a user interface of the client device as a response to a display of the image, wherein the individual stored images of the dataset of stored images include one or more tags that identify a dominant object of the individual stored images, the method further comprising identifying a tag from the one or more tags that is associated with the particular stored image, wherein identifying the plurality of comments is further based at least in part on the tag, wherein the tag is a first tag, the particular stored image is a first particular stored image, and the dataset of stored images is a first dataset of stored images, and further comprising:
determining that a number of the plurality of comments is greater than a predetermined threshold number of comments;
identifying a second tag that is associated with the first tag, based at least in part on a dataset index that identifies an association between the first tag and the second tag;
identifying a second dataset of stored images that is associated with the second tag;
determining a similarity between the image and stored images of the second dataset of stored images;
identifying a second particular stored image from the second dataset of stored images, based at least in part on the similarity; and
wherein identifying the plurality of comments is further based at least in part on additional comments associated with the second tag.

20. The computer-implemented method of claim 19, wherein the first tag identifies the dominant object of the image as a tangible entity, and wherein the second tag further describes features commonly associated with the tangible entity.

* * * * *